(12) United States Patent
Deicke

(10) Patent No.: US 10,006,442 B2
(45) Date of Patent: Jun. 26, 2018

(54) DRIVE TRAIN AND WIND POWER PLANT WITH A DRIVE TRAIN

(71) Applicant: SIEMENS AKTIENGESELLSCHAFT, München (DE)

(72) Inventor: Matthias Deicke, Uetze/Schwüblingsen (DE)

(73) Assignee: Siemens Aktiengesellschaft, München (DE)

( * ) Notice: Subject to any disclaimer, the term of this patent is extended or adjusted under 35 U.S.C. 154(b) by 24 days.

(21) Appl. No.: 14/838,954

(22) Filed: Aug. 28, 2015

(65) Prior Publication Data

US 2016/0061190 A1  Mar. 3, 2016

(30) Foreign Application Priority Data

Aug. 29, 2014 (EP) .................................. 14182832

(51) Int. Cl.

| | |
|---|---|
| F02B 63/04 | (2006.01) |
| H02K 7/10 | (2006.01) |
| H02K 7/18 | (2006.01) |
| F03D 11/00 | (2006.01) |
| F03D 1/06 | (2006.01) |
| H02K 7/116 | (2006.01) |
| H02K 9/19 | (2006.01) |
| F03D 80/70 | (2016.01) |
| F03D 15/00 | (2016.01) |
| F03D 80/80 | (2016.01) |
| F03D 9/25 | (2016.01) |
| H02K 9/00 | (2006.01) |
| F16H 57/04 | (2010.01) |

(52) U.S. Cl.
CPC ............ *F03D 11/0008* (2013.01); *F03D 1/06* (2013.01); *F03D 9/25* (2016.05); *F03D 15/00* (2016.05); *F03D 80/70* (2016.05); *F03D 80/80* (2016.05); *H02K 7/116* (2013.01); *H02K 9/19* (2013.01); *F05B 2260/98* (2013.01); *Y02E 10/721* (2013.01); *Y02E 10/725* (2013.01); *Y02P 80/158* (2015.11)

(58) Field of Classification Search
CPC ....................................................... F02C 7/275
USPC ............................ 74/606 R; 290/1 C; 310/54
See application file for complete search history.

(56) References Cited

U.S. PATENT DOCUMENTS

| | | | | |
|---|---|---|---|---|
| 1,357,301 A | * | 11/1920 | Reaugh ............... | F04C 15/0088 |
| | | | | 184/11.1 |
| 3,871,484 A | * | 3/1975 | Thomas ..................... | F16N 7/32 |
| | | | | 137/577 |
| 4,669,263 A | | 6/1987 | Sugiyama | |

(Continued)

FOREIGN PATENT DOCUMENTS

| | | |
|---|---|---|
| CN | 201367991 Y | 12/2009 |
| DE | 102007012408 A1 | 9/2008 |

(Continued)

*Primary Examiner* — Pedro J Cuevas
(74) *Attorney, Agent, or Firm* — Henry M. Feiereisen LLC

(57) ABSTRACT

A drive train includes a gearbox having a gearbox housing, and a generator having a generator housing. A lubricating oil system including an oil reservoir lubricates toothed contact areas and/or bearings which are arranged within the gearbox housing. The oil reservoir is arranged within the generator housing or on an exterior side of the generator housing.

19 Claims, 2 Drawing Sheets

(56) References Cited

U.S. PATENT DOCUMENTS

| | | | | |
|---|---|---|---|---|
| 5,034,638 A * | 7/1991 | McCabria | ............... | H02K 9/19 310/52 |
| 6,833,641 B2 * | 12/2004 | Uchida | .................. | B60K 6/26 310/52 |
| 7,347,169 B2 * | 3/2008 | Nagahashi | ............... | F01M 1/08 123/41.31 |
| 7,834,500 B2 * | 11/2010 | Savant | .................. | H02K 7/108 192/56.6 |
| 8,405,243 B2 * | 3/2013 | Siegfriedsen | ........... | F03D 80/70 290/55 |
| 9,006,942 B2 * | 4/2015 | Lemmers, Jr. | ......... | H02K 1/185 310/54 |
| 9,335,317 B2 * | 5/2016 | Matsubara | ........... | G01M 13/04 |
| 9,745,870 B2 * | 8/2017 | Johnson | .................. | F01K 3/262 |
| 9,855,833 B2 * | 1/2018 | Gale | ...................... | B60K 6/445 |
| 2004/0124722 A1 * | 7/2004 | Uchida | .................. | B60K 6/26 310/54 |
| 2005/0034925 A1 * | 2/2005 | Flamang | ............. | F16H 57/0402 184/6.12 |
| 2007/0200439 A1 * | 8/2007 | Nagahashi | ............. | F01M 1/08 310/54 |
| 2008/0127774 A1 * | 6/2008 | Frost | ....................... | F02C 7/275 74/606 R |
| 2008/0236952 A1 | 10/2008 | Shimizu et al. | | |
| 2009/0107769 A1 * | 4/2009 | Sato | ....................... | B60K 6/365 184/6.2 |
| 2010/0019505 A1 | 1/2010 | Frost | | |
| 2010/0052442 A1 * | 3/2010 | Savant | .................. | H02K 7/108 310/78 |
| 2010/0164232 A1 * | 7/2010 | Siegfriedsen | ........... | F03D 80/70 290/55 |
| 2010/0283334 A1 * | 11/2010 | Lemmers, Jr. | ......... | H02K 1/185 310/54 |
| 2011/0150655 A1 * | 6/2011 | Tietze | ................ | F16H 57/0447 416/170 R |
| 2011/0286844 A1 | 11/2011 | Takayanagi | | |
| 2012/0211307 A1 * | 8/2012 | Nielsen | ............... | F03D 11/0008 184/4 |
| 2013/0001017 A1 * | 1/2013 | Saenz de Ugarte Sevilla | ................... | F03D 80/70 184/6.12 |
| 2013/0270937 A1 * | 10/2013 | Rasmussen | ............ | H02K 9/005 310/54 |
| 2014/0007657 A1 * | 1/2014 | Matsubara | ............ | G01M 13/04 73/53.05 |
| 2017/0082244 A1 * | 3/2017 | Gale | ........................ | F04B 51/00 |
| 2017/0335724 A1 * | 11/2017 | Johnson | ................ | F01K 7/36 |

FOREIGN PATENT DOCUMENTS

| | | | | |
|---|---|---|---|---|
| GB | 2201200 A | * | 8/1988 | ......... F16H 57/0421 |
| WO | WO 2009147147 A2 | | 12/2009 | |
| WO | 102009048766 A1 | | 4/2011 | |
| WO | WO 2011117005 A2 | | 9/2011 | |
| WO | WO 2012073505 A1 | | 6/2012 | |

* cited by examiner

DRIVE TRAIN AND WIND POWER PLANT WITH A DRIVE TRAIN

CROSS-REFERENCES TO RELATED APPLICATIONS

This application claims the priority of European Patent Application, Serial No. 14182832.7, filed Aug. 29, 2014, pursuant to 35 U.S.C. 119(a)-(d), the disclosure of which is incorporated herein by reference in its entirety as if fully set forth herein.

BACKGROUND OF THE INVENTION

The present invention relates to a drive train and to a wind power plant with such a drive train.

The following discussion of related art is provided to assist the reader in understanding the advantages of the invention, and is not to be construed as an admission that this related art is prior art to this invention.

Conventional wind power plants normally include a tower, a mounting platform rotatably fastened to the upper end of the tower, and a drive train arranged on the mounting platform. The drive train includes a rotor driven by wind and fastened to a rotor shaft which is supported on a bearing block. The rotor shaft is connected to a gearbox input shaft of a gearbox by way of at least one connecting element. The output shaft of the gearbox is in turn connected to a generator rotor arranged in a generator housing. The generator is connected to a frequency converter which is designed to control the generator and to feed the energy produced by the generator into a mains supply.

During operation of a wind power plant, energy is drawn from wind flow by the rotor which is thus caused to rotate. The rotational movement of the rotor is transmitted via the rotor shaft to the gearbox, which increases the rotational speed. Generally, the generator can be designed smaller as the rotational speed increases. This would be desired in terms of both stability and cost of the wind power plant. The gearbox is normally designed in a multi-stage manner, with planetary gearboxes being primarily used in larger plants at least for slow rotating gearbox stages. The output shaft of the gearbox drives the generator, converting the mechanical energy into electrical energy, which is then fed into a mains supply by way of the frequency converter.

In order to lubricate tooth contact areas and/or bearings arranged within a gearbox housing, drive trains are usually equipped with a lubricating oil system which has an oil reservoir that is provided either within the gearbox housing or as an external oil reservoir in a direct vicinity of the gearbox, i.e., in relation to an imaginary parting line between the housing and the generator on the side of the gearbox. When using an external reservoir, gearboxes with a number of planetary stages without spur wheel stages are provided in particular, since adequate installation space for required oil quantity is not available in view of the absence of a spur wheel case.

In both instances, accommodation of an oil reservoir is generally very complex and expensive, since providing installation space is problematic.

It would therefore be desirable and advantageous to provide an improved drive train which obviates prior art shortcomings and yet is of simple and inexpensive structure while yet being reliable in operation.

SUMMARY OF THE INVENTION

According to one aspect of the present invention, a drive train includes a gearbox including a gearbox housing, a generator including a generator housing; and a lubricating oil system including an oil reservoir configured to lubricate toothed contact areas and/or bearings arranged within the gearbox housing, the oil reservoir arranged within the generator housing or on an exterior side of the generator housing.

The present invention resolves prior art shortcomings by forming a unit of the oil reservoir and the generator housing. Since the generators in drive trains usually require less installation space than the gearbox, integration of the oil reservoir and the generator provides a simplified construction. Moreover, a drive train according to the present invention can be manufactured compact, with less components, and at a low cost. In addition, the lubricating oil can advantageously be preheated in the event of a power failure by way of no-load losses of the generator, eliminating the need for separate heating facilities.

According to another advantageous feature of the present invention, the oil reservoir can be arranged at least partially above a static oil level. Thus, oil can advantageously be pumped into the oil reservoir during operation, resulting in a drop in an oil level within the gearbox housing and thus in an increase in efficiency. In addition, emergency lubrication properties can be realized easily, since the lubricating oil can be guided out of the oil reservoir to areas to be lubricated due to gravitational effects.

According to another advantageous feature of the present invention, the oil reservoir can be arranged at least partially below a static oil level. This is advantageous because oil can automatically flow into the oil reservoir due to gravitational effects.

According to another advantageous feature of the present invention, the oil reservoir can be arranged concentrically with respect to an axis of a generator shaft of the generator. In this case, the oil reservoir extends essentially annularly around the generator shaft, using an existing installation space very well. Furthermore, the oil reservoir can be arranged partially both above and below a static oil level.

According to another advantageous feature of the present invention, at least one gearbox stage may be formed by a planetary gearbox. Planetary gearboxes usually have lower bearing reaction forces compared to helical gearboxes, for a more efficient drive train. Advantageously, no gearbox stage is formed by a helical gearbox.

According to another advantageous feature of the present invention, the gearbox housing and the generator housing may be connected to one another. Advantageously, the gearbox housing and the generator housing can be flange-mounted to each other. As a result, the drive train is of very compact design.

According to another advantageous feature of the present invention, the generator can have a generator cooling circuit, with the lubricating oil system being operably connected to the generator cooling circuit. Thus, the lubricating oil can be cooled by way of the generator cooling circuit. Therefore no separate cooling circuit is required to cool the lubricating oil.

According to another advantageous feature of the present invention, the lubricating oil system can be configured to lubricate a drive train component arranged outside of the gearbox housing, or lubricate bearings arranged in the generator housing and accommodating a generator shaft of the generator. Advantageously, the lubricating oil system can be configured to lubricate a bearing block provided to support a rotor shaft to which a rotor is mounted. Advantageously, an individual lubricating oil system may be used to lubricate all components of the drive train.

According to another advantageous feature of the present invention, the generator can have a generator shaft of hollow configuration to form an oil-conducting pipe of the lubricating oil system. This facilitates a supply of oil to the bearings accommodating the generator shaft. When non-permanent magnet generators are involved, the generator rotor may be cooled by way of a cooled generator shaft.

According to another aspect of the present invention, a wind power plant includes a drive train, with the drive train including a gearbox including a gearbox housing, a generator including a generator housing, and a lubricating oil system including an oil reservoir configured to lubricate toothed contact areas and/or bearings arranged within the gearbox housing, with the oil reservoir arranged within the generator housing or on an exterior side of the generator housing.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
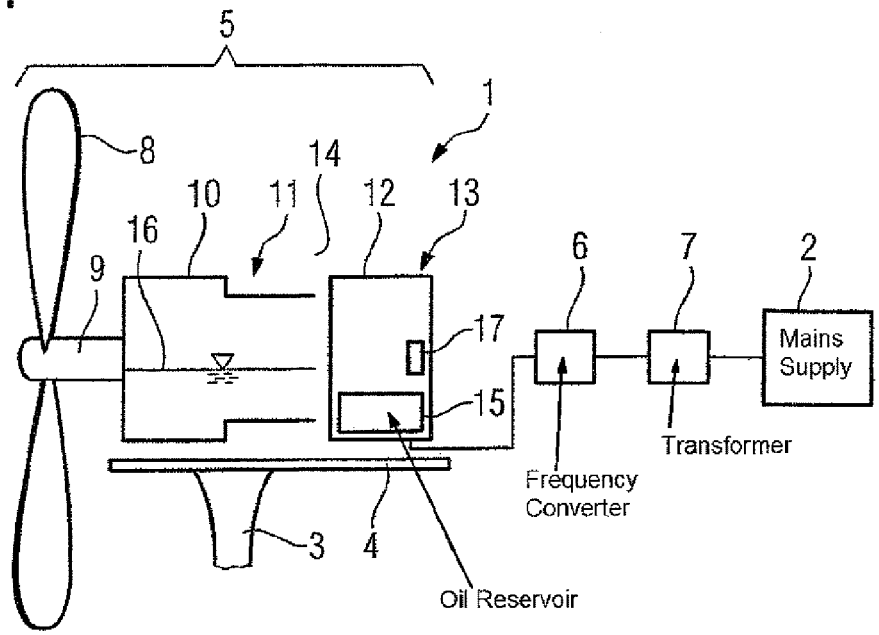
FIG. 1 shows a schematic illustration of a first embodiment of a drive train of a wind power plant according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a first embodiment of a wind power plant 1 according to the present invention, generally designated by reference numeral 1 and connected to a mains supply 2. The wind power plant 1 has as main components a tower 3, a mounting platform 4 fastened rotatably on an upper end of the tower 3, a drive train 5 arranged on the mounting platform 4, and a frequency converter 6 which is normally also positioned on the mounting platform 4 and connected to the mains supply 2 by way of a transformer 7. The drive train 5 includes a rotor 8 which is driven by wind, the rotor 8 being fastened to a rotor shaft 9 that is supported on a bearing block. The rotor shaft 9 is guided into a gearbox housing 10 of a gearbox 11. The gearbox 11 has a number of gearbox stages, which are formed in each case by a planetary gearbox. Although not shown in FIG. 1, the gearbox 11 has an output shaft connected to a generator rotor, which is integrated in accordance with the present invention, and arranged within a generator housing 12 of a generator 13. The generator 13 is connected to the frequency converter 6, which is designed to control the generator 13 and to feed energy produced by the generator 13 into the mains supply 2. The gearbox housing 10 is flange-mounted on the generator housing 12, with an interface 14 between the gearbox 11 and the generator 13.

In order to lubricate components of the drive train 5, in particular, tooth contact areas and/or bearings arranged within the generator housing 12, and accommodate the generator rotors of the bearing block and further drive train components if necessary, the drive train 5 is equipped with a lubricating oil system, though not shown in further detail but integrated in accordance with the present invention. The lubricating oil system can include a lubricating oil pump, lubricating oil pipes in the form of piping, hoses or channels, lubricating oil distributors, oil injection facilities or the like. The lubricating oil system comprises an oil reservoir 15, which is used to supply the lubricating oil system with lubricating oil. The oil reservoir 15 is arranged within the generator housing 12 below a static oil level 16 of the gearbox 11 and is operably connected to a generator cooling circuit 17.

During operation of the wind power plant 1, energy is drawn from wind flow by the rotor 8, which is thus caused to rotate. The rotational movement of the rotor 8 is transmitted to the gearbox 11 via the rotor shaft 9, which is used to increase the rotational speed. The output shaft of the gearbox 11, although not shown in FIG. 1, is integrated in accordance with the present invention, and drives the generator 13, converting mechanical energy into electrical energy, which is then fed into a mains supply 2 by way of the frequency converter 6 and the transformer 7.

The oil reservoir 15 is arranged within the generator housing 12 for a simplified arrangement, since the generator 13 provides sufficient installation space. The oil reservoir 15 can also be constructed with just a few components. A positioning of the oil reservoir 15 below the static oil level 16 is advantageous in that oil can automatically flow into the oil reservoir 15 under gravitational effects.

Figure 2:
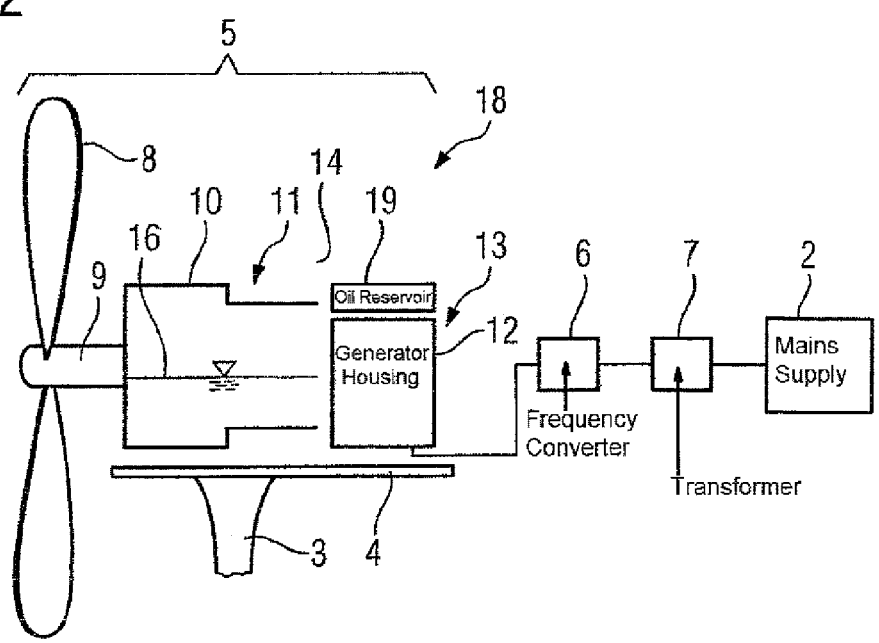
FIG. 2 shows a schematic illustration of a second embodiment of a drive train of a wind power plant according to the present invention.

FIG. 2 shows a schematic illustration of a second embodiment of a wind power plant according to the present invention, generally designated by reference numeral 18. Parts corresponding with those in FIG. 1 are denoted by identical reference numerals and not explained again. The description below will center on the differences between the embodiments. In this embodiment, the oil reservoir 19 is positioned such that it is fastened to an exterior of the generator housing 12 above the static oil level 16. Oil is thereby pumped into the oil reservoir 19 during operation, which results in a drop in an oil level within the gearbox housing 10 and thus in an increase in efficiency. Alternatively however, the oil reservoir 19 can also be fastened below the static oil level on the generator housing. Oil can thereby flow into the oil reservoir under gravitational effects. According to a further embodiment, at least one wall of the oil reservoir 15 can be formed by the gearbox housing 12, as a result of which material can be saved.

Figure 3:
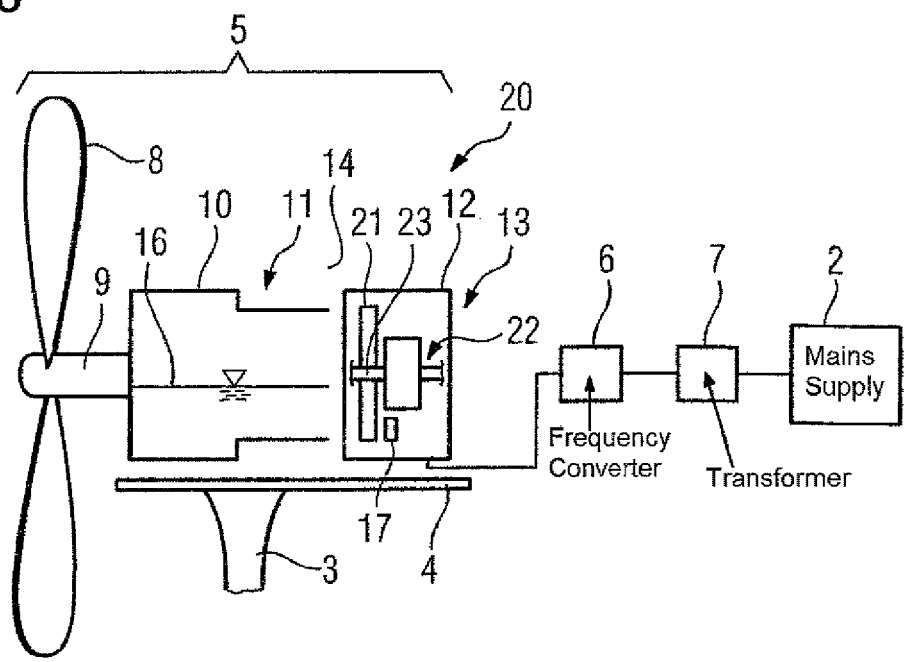
FIG. 3 shows a schematic illustration of a third embodiment of a drive train of a wind power plant according to the present invention.

FIG. 3 shows a schematic illustration of a third embodiment of a wind power plant according to the present invention, generally designated by reference numeral 20. Parts corresponding to those in FIG. 1 are denoted by identical reference numerals and are not explained again. The description below will center on the differences between the embodiments. In this embodiment, the oil reservoir 21 is positioned within the generator housing 12. However, conversely to the oil reservoir 15 of FIG. 1, the oil reservoir 21 in this embodiment is arranged concentrically with respect to axes of a generator shaft 23 accommodating a generator rotor 22. Accordingly, the oil reservoir 21 extends essentially annularly around the generator shaft 23, utilizing an existing installation space well. Furthermore, the oil reservoir 21 is arranged partially both above and below the static oil level 16, combining advantages from the first and second embodiments. In the wind power plants 1, 18 and 20, shown in FIGS. 1, 2, and 3, respectively, an oil-conducting pipe of the lubricating oil system can be configured as a hollow generator shaft, which simplifies lubrication of the bearings accommodating the generator shaft.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive train of a wind power plant, comprising:
   a gearbox including a gearbox housing;
   a non-permanent magnet generator including a generator housing; and
   a lubricating oil system including lubricating oil pipes, or oil injection facilities and an oil reservoir configured to lubricate toothed contact areas and/or bearings arranged within the gearbox housing, said oil reservoir arranged within the generator housing or fastened directly exclusively to an exterior side of the generator housing, with no separate lubricating oil system arranged within the gearbox housing.

2. The drive train of claim 1, wherein the oil reservoir is arranged at least partially above a static oil level.

3. The drive train of claim 1, wherein the oil reservoir is arranged at least partially below a static oil level.

4. The drive train of claim 1, wherein the generator has a generator shaft defining an axis, said oil reservoir being arranged in concentric relationship to the axis of the generator shaft.

5. The drive train of claim 1, wherein the gearbox includes at least one gearbox stage, said at least one gearbox stage being formed by a planetary gearbox.

6. The drive train of claim 1, wherein the gearbox is configured to have plural gearbox stages, none of said gearbox stages being formed by a helical gearbox.

7. The drive train of claim 1, wherein the gearbox housing and the generator housing are connected to each other.

8. The drive train of claim 1, wherein the gearbox housing and the generator housing are flange-mounted to each other.

9. The drive train of claim 1, wherein the generator comprises a generator cooling circuit, said lubricating oil system being operatively connected to the generator cooling circuit.

10. The drive train of claim 1, wherein the lubricating oil system is configured to lubricate a drive train component arranged outside of the gearbox housing.

11. The drive train of claim 1, further comprising a rotor shaft and rotor mounted on the rotor shaft, said lubricating oil system being configured to lubricate a bearing block provided to support the rotor shaft.

12. The drive train of claim 1, wherein the generator has a generator shaft of hollow configuration to form an oil-conducting pipe of the lubricating oil system.

13. A wind power plant, comprising a drive train, said drive train comprising a gearbox including a gearbox housing, a non-permanent magnet generator including a generator housing, and a lubricating oil system including lubricating oil pipes or oil injection facilities and an oil reservoir configured to lubricate toothed contact areas and/or bearings arranged within the gearbox housing, said oil reservoir arranged within the generator housing or fastened directly exclusively to an exterior side of the generator housing, with no separate lubricating oil system arranged within the gearbox housing, wherein the oil reservoir is arranged at least partially above a static oil level, or at least partially below a static oil level, or in concentric relationship to a generator shaft of the generator.

14. The wind power plant of claim 13, wherein the gearbox includes at least one gearbox stage, said at least one gearbox stage being formed by a planetary gearbox.

15. The wind power plant of claim 13, wherein the gearbox housing and the generator housing are flange-mounted to each other.

16. The wind power plant of claim 13, wherein the generator comprises a generator cooling circuit, said lubricating oil system being operatively connected to the generator cooling circuit.

17. The wind power plant of claim 13, wherein the lubricating oil system is configured to lubricate a drive train component arranged outside of the gearbox housing.

18. The wind power plant of claim 13, wherein the drive train includes a rotor shaft and rotor mounted on the rotor shaft, said lubricating oil system being configured to lubricate a bearing block provided to support the rotor shaft.

19. The wind power plant of claim 13, wherein the generator has a generator shaft of hollow configuration to form an oil-conducting pipe of the lubricating oil system.

* * * * *